US008096208B2

(12) United States Patent
Sean (10) Patent No.: US 8,096,208 B2
(45) Date of Patent: Jan. 17, 2012

(54) POSITIONING APPARATUS FOR A BICYCLE SHIFT CONTROL DEVICE

(75) Inventor: Yau Yong Sean, Jurong Town (SG)

(73) Assignee: Shimano (Singapore) Pte. Ltd., Jurong Town (SG)

( * ) Notice: Subject to any disclaimer, the term of this patent is extended or adjusted under 35 U.S.C. 154(b) by 1142 days.

(21) Appl. No.: 11/865,422

(22) Filed: Oct. 1, 2007

(65) Prior Publication Data

US 2008/0230664 A1 Sep. 25, 2008

(30) Foreign Application Priority Data

Mar. 19, 2007 (JP) .................................. 2007-069957

(51) Int. Cl.
*F16C 1/10* (2006.01)
*G05G 1/08* (2006.01)
*B62K 25/02* (2006.01)

(52) U.S. Cl. ........................... 74/502.2; 74/498; 74/475

(58) Field of Classification Search .................... 74/142, 74/473.14, 489, 502.2, 501.6
See application file for complete search history.

(56) References Cited

U.S. PATENT DOCUMENTS

| 5,044,213 | A | * | 9/1991 | Nagano ........................... 74/142 |
| 5,095,768 | A | * | 3/1992 | Nagano ...................... 74/473.14 |
| 5,588,331 | A | | 12/1996 | Huang et al. |
| 5,799,542 | A | | 9/1998 | Yamane |
| 5,921,139 | A | | 7/1999 | Yamane |
| 6,467,368 | B1 | | 10/2002 | Feng et al. |
| 6,502,477 | B1 | * | 1/2003 | Assel ............................ 74/502.2 |
| 6,553,860 | B2 | * | 4/2003 | Blaschke ...................... 74/502.2 |
| 6,718,844 | B2 | | 4/2004 | Hanatani |
| 6,877,393 | B2 | | 4/2005 | Takachi |
| 2001/0029803 | A1 | | 10/2001 | Blaschke |
| 2002/0112559 | A1 | | 8/2002 | Liu |
| 2005/0034554 | A1 | | 2/2005 | Hou |
| 2006/0130602 | A1 | | 6/2006 | Kawakami |
| 2006/0260428 | A1 | | 11/2006 | Kawakami |
| 2010/0282015 | A1 | * | 11/2010 | Lude .............................. 74/491 |

FOREIGN PATENT DOCUMENTS

| EP | 1118534 A2 | 1/2001 |
| EP | 1726520 A2 | 5/2006 |
| GB | 2169065 A | 7/1986 |
| GB | 2183796 A | 6/1987 |
| JP | 2007-1561 A | 1/2007 |

OTHER PUBLICATIONS

European Search Report for EP 07119004.5, the European application that corresponds to this application, dated Sep. 1, 2010.

* cited by examiner

*Primary Examiner* — Vinh T. Luong
(74) *Attorney, Agent, or Firm* — James A. Deland (57) ABSTRACT

A positioning apparatus for a shift control device for a bicycle transmission comprises a movable member having a positioning element, a positioning member having a positioning element structured to engage the positioning element of the movable member, and a biasing member that biases the positioning member towards an engaged position wherein the positioning element of the positioning member engages the positioning element of the movable member. The positioning member moves toward and away from a plane of movement of the movable member. A releasing member is disposed between the movable member and the positioning member, wherein the releasing member moves between an initial position and an operating position. The releasing member allows the positioning member to be in the engaged position when the releasing member is in the initial position, and the positioning member moves to the disengaged position when the releasing member moves to the operating position.

20 Claims, 12 Drawing Sheets

POSITIONING APPARATUS FOR A BICYCLE SHIFT CONTROL DEVICE

BACKGROUND OF THE INVENTION

The present invention is directed to bicycle shift control devices and, more particularly, to a positioning apparatus for a bicycle shift control device.

Typical bicycle transmissions include internal transmissions (e.g., internal hub transmissions) and external transmissions (e.g., derailleurs). One or more shift control devices mounted near the rider are used to control the operation of such bicycle transmissions. Each shift control device usually is coupled to an associated transmission through a shift control cable in the form of a Bowden cable. A conventional shift control device comprises a winding lever, a release lever, and a positioning mechanism for positioning the shift control cable in the various transmission operating positions. Such a shift control device is shown in Japanese Laid-Open Patent Application No. 2007-001561, for example.

A conventional positioning mechanism comprises a movable member (typically a winding body) with a portion that rotates within a plane, a positioning member that positions the movable member in a plurality of predetermined shift positions, a biasing member that biases the positioning member towards the movable member, a winding lever that rotates the movable member in a winding direction, and a release lever that cooperates with the positioning member to allow the movable member to rotate in an unwinding direction. A typical release lever is located away from the positioning member, wherein the positioning member is disposed between the release lever and the movable member. This limits the ability to design a compact shift control device.

SUMMARY OF THE INVENTION

The present invention is directed to various features of a bicycle shift control device. In one embodiment, a positioning apparatus for a shift control device for a bicycle transmission comprises a movable member having a positioning element, a positioning member having a positioning element structured to engage the positioning element of the movable member, and a biasing member that biases the positioning member towards an engaged position such that the positioning element of the positioning member engages the positioning element of the movable member. The positioning member moves toward and away from a plane of movement of the movable member. A releasing member is disposed between the movable member and the positioning member, wherein the releasing member moves between an initial position and an operating position. The releasing member allows the positioning member to be in the engaged position when the releasing member is in the initial position, and the positioning member moves to the disengaged position when the releasing member moves to the operating position. Additional inventive features will become apparent from the description below, and such features alone or in combination with the above features and their equivalents may form the basis of further inventions as recited in the claims.

DETAILED DESCRIPTION OF THE EMBODIMENTS

Figure 1:
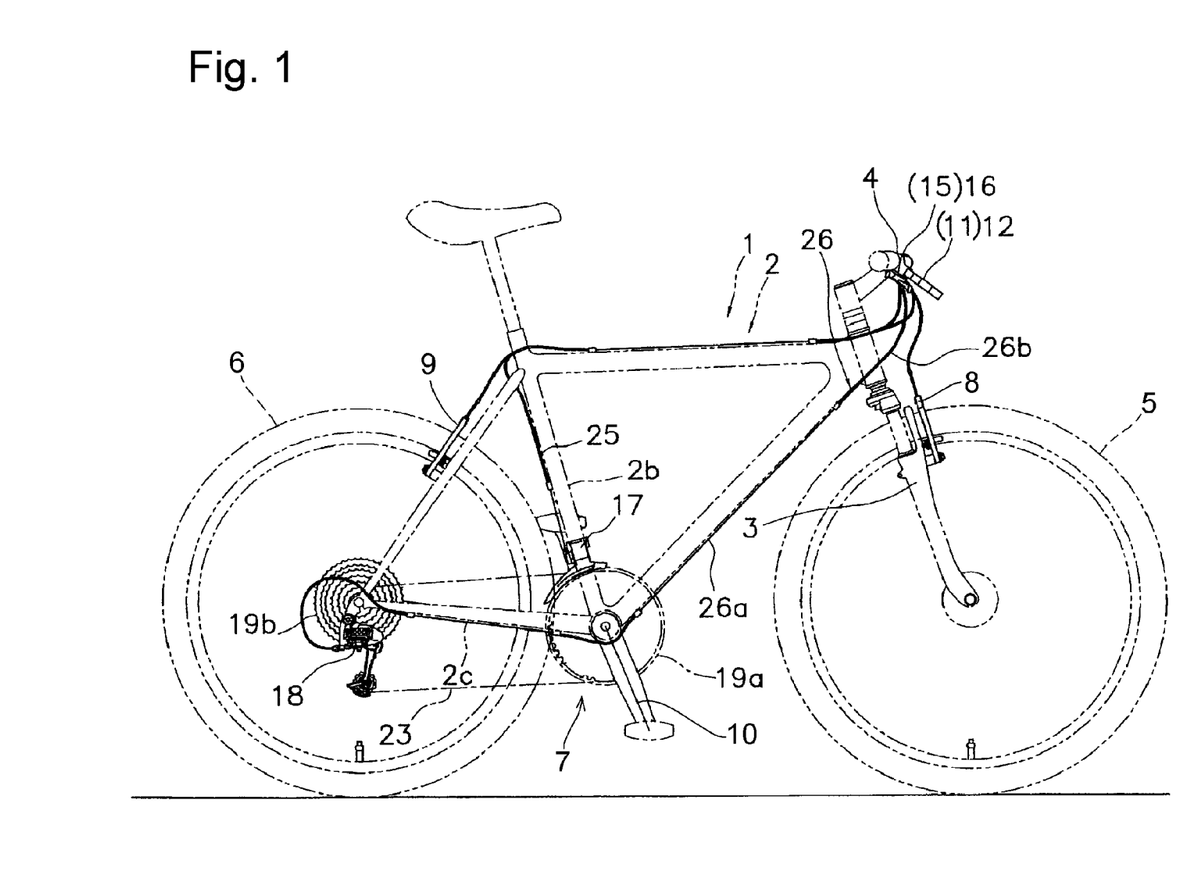
FIG. 1 is a side view of a bicycle that employs embodiments of shift control devices.

FIG. 1 is a side view of a particular embodiment of a bicycle 1. Bicycle 1 is a mountain bicycle comprising a diamond-shaped frame 2, a front fork 3 rotatably mounted to frame 2, a handlebar assembly 4 mounted to the upper part of fork 3, a front wheel 5 rotatably attached to the lower part of fork 3, a rear wheel 6 rotatably attached to the rear of frame 2, and a drive unit 7. A front wheel brake 8 is provided for braking front wheel 5, and a rear wheel brake 9 is provided for braking rear wheel 6.

Drive unit 7 comprises a chain 23, a front sprocket assembly 19a coaxially mounted with a pedal crank unit 10 having pedals, a front derailleur 17 attached to a seat tube 2b of frame 2, a rear sprocket assembly 19b coaxially mounted with rear wheel 6, and a rear derailleur 18 mounted to the rear end of a chain stay 2c of frame 2. In this embodiment, front sprocket assembly 19a comprises three sprockets mounted coaxially with crank unit 10, and rear sprocket assembly 18 comprises nine sprockets mounted coaxially with rear wheel 6. Front derailleur 17 moves to three operating positions to switch chain 23 among selected ones of the three front sprockets, and rear derailleur 18 moves to nine operating positions to switch chain 23 among selected ones of the ten rear sprockets.

Front derailleur 17 and rear derailleur 18 are connected to respective front and rear shift control devices 15 and 16 through respective front and rear shift cables 25 and 26. Front and rear shift control devices 15 and 16 are mounted inside of and in proximity to brake lever assemblies 11 and 12 mounted on handlebar 4. Front and rear shift control devices 15 and 16 have a symmetrical construction, and the configuration and operation of each is substantially the same except for the number of shift stages. Thus, only rear shift control device 16 will be described in detail.

Figure 2:
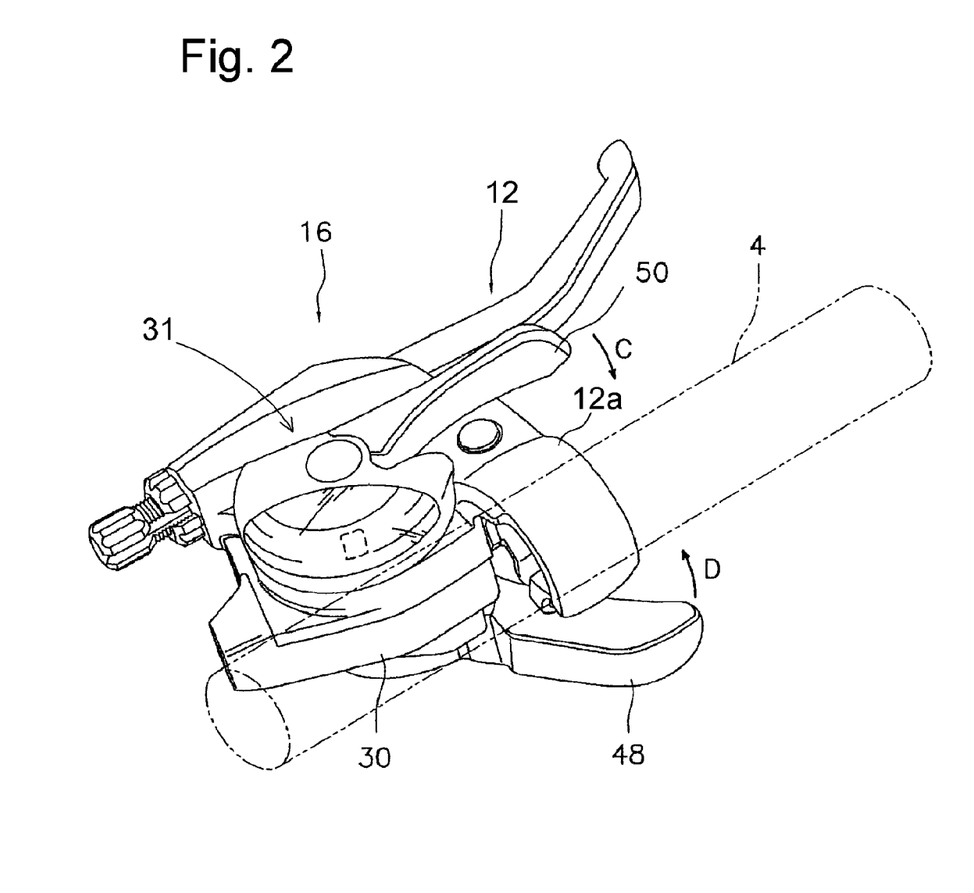
FIG. 2 is a perspective view of a rear shift control device.

As shown in FIG. 2, rear shift control device 16 includes a mounting bracket 30 structured to be mounted to handlebar 4, a winding lever 48, and a release lever 50. In this embodiment, mounting bracket 30 is integrally secured to a mounting bracket 12a of rear brake lever assembly 12. Of course, mounting bracket 30 may be configured separate from bracket 12a of rear brake lever assembly 12, if desired.

Figure 3:
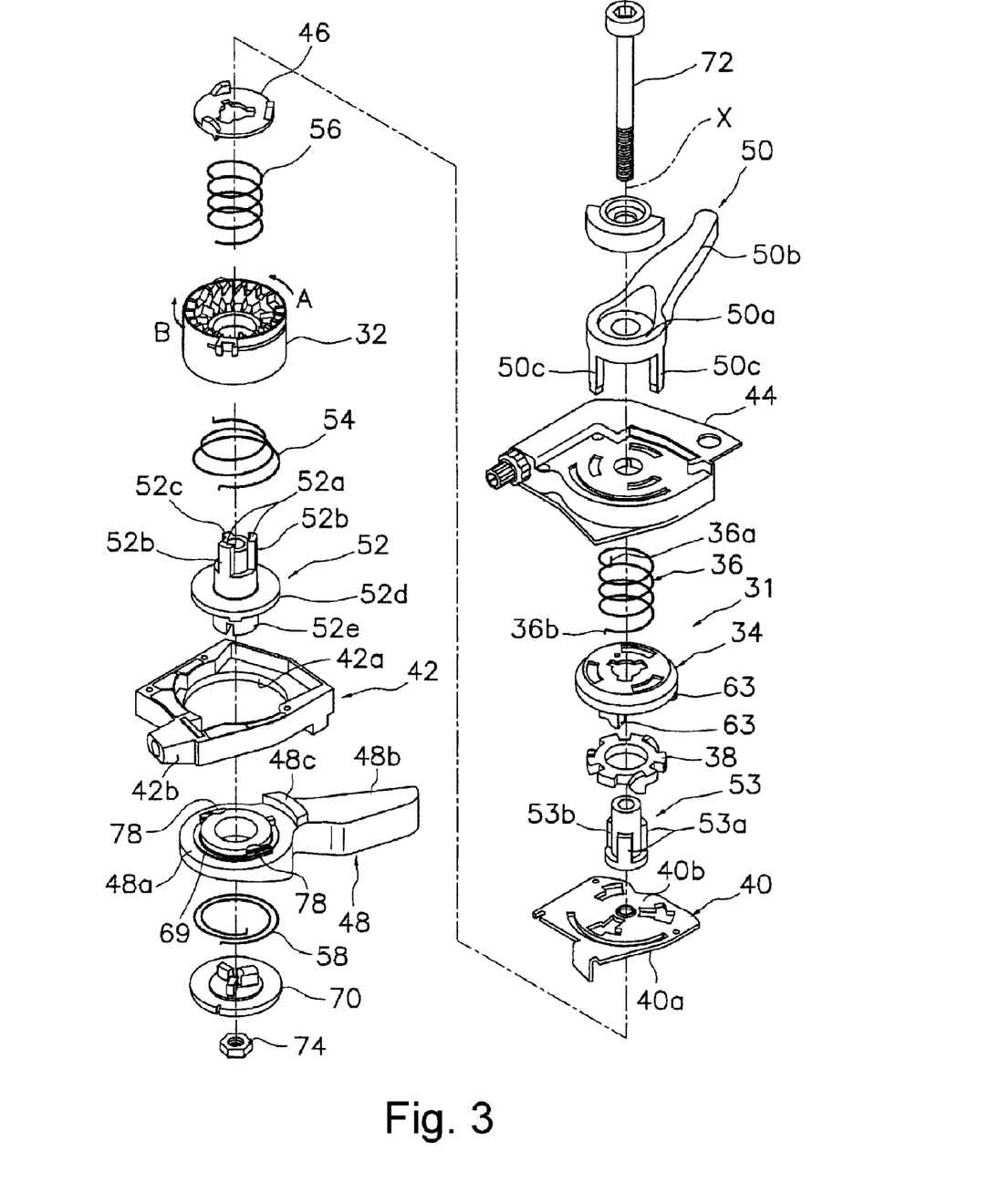
FIG. 3 is an exploded perspective view of the shift control device.

FIG. 3 is an exploded perspective view of rear shift control device 16. Rear shift control device further comprises a mounting bracket 40 integrally secured to mounting bracket 12a (only the relevant portion of mounting bracket 40, which is part of mounting bracket 30, is shown), a first cover member 42, and a second cover member 44. First cover member 42 covers a flat planar lower surface 40a of bracket 40, and second cover member 44 covers a flat planar upper surface 40b of bracket 40. First cover member 42 and second cover member 44 are secured to bracket 40 by three screws (not shown).

Figure 4:
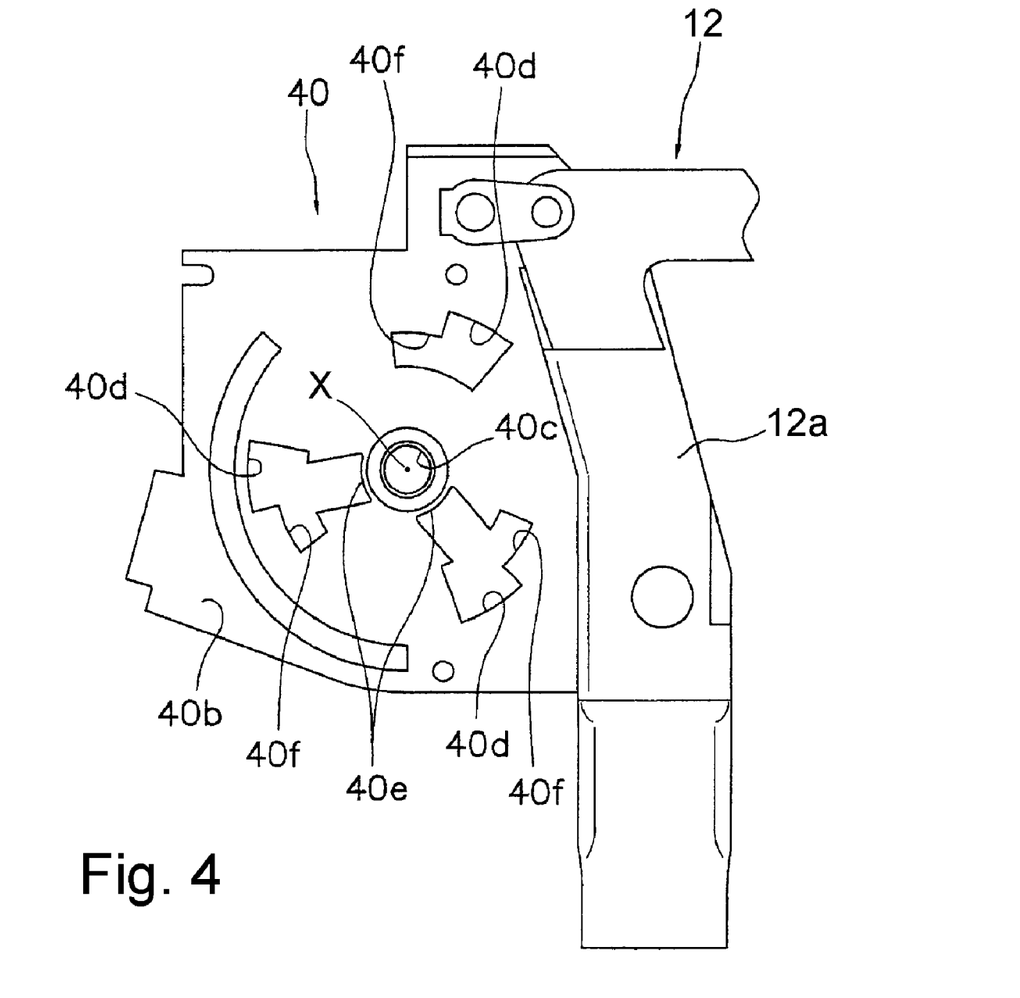
FIG. 4 is a plan view of a bracket for the shift control device.

Bracket 40 is a metal plate-shaped member. As shown in FIG. 4, bracket 40 includes a through hole 40c surrounding a rotational axis X, three arcuate slits 40d circumferentially disposed radially outwardly from through hole 40c, two through holes 40e extending radially inwardly from two of the slits 40d, and an arcuate slit 40f extending circumferentially but somewhat radially inwardly from each arcuate slit 40d. Through holes 40c, 40e and arcuate slits 40d, 40f may be formed by punching the plate that forms bracket 40, for example.

First cover member 42 is formed of a synthetic resin. As shown in FIG. 3, first cover member 42 includes a through hole 42a and an outer casing fixing portion 42b that extends from a side portion of first cover member 42. Through hole 42a is dimensioned for receiving a movable member in the form of a winding body 32 therethrough, and outer casing fixing portion 42b couples to and terminates an outer casing 26b (FIG. 1) of rear shift cable 26.

Figure 5:
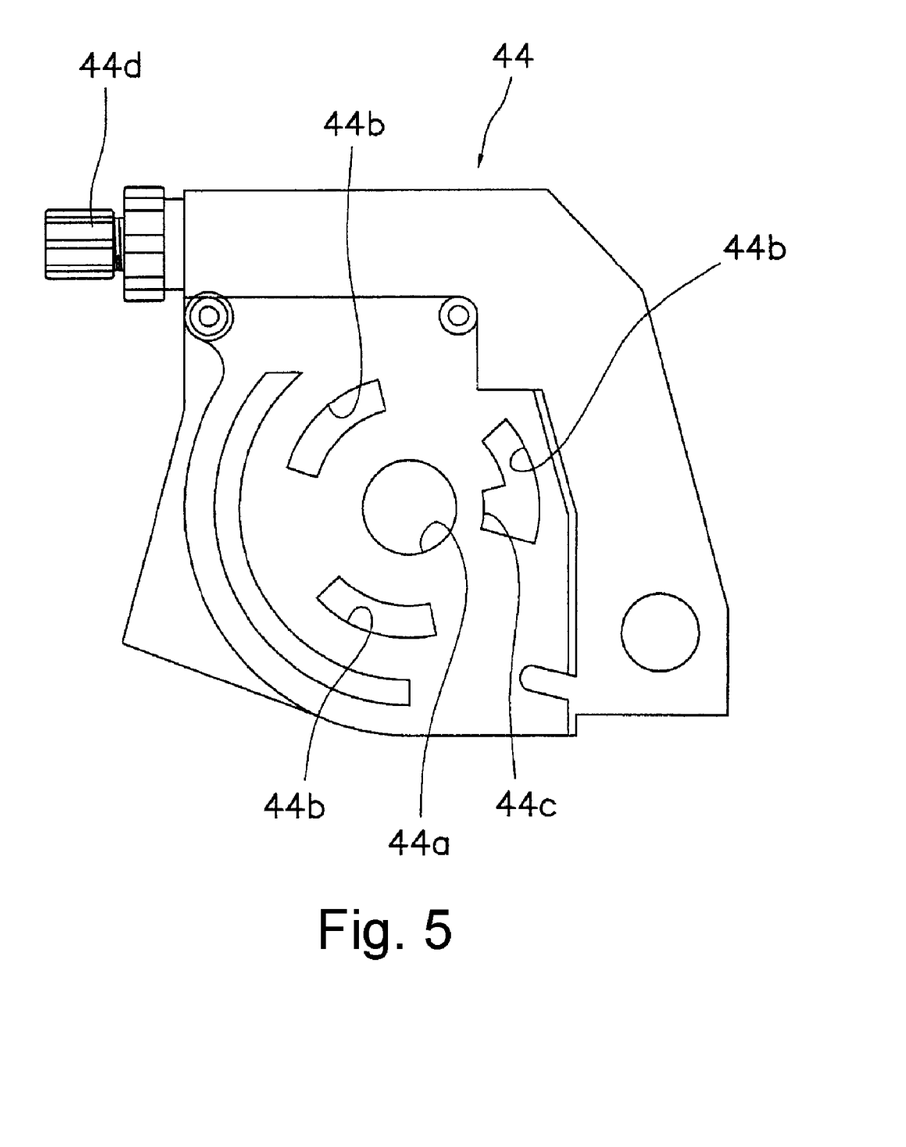
FIG. 5 is a plan view of a cover member for the shift control device.

Second cover member 44 also is formed of a synthetic resin. As shown in FIG. 5, second cover member 44 includes a through hole 44a, three arcuate slits 44b circumferentially disposed radially outwardly from through hole 44a, a spring receiving opening 44c extending radially inwardly from one of the slits 44b, and an outer casing fixing portion 44d that extends from a side surface of second cover member 44. Outer casing fixing portion 44d couples to and terminates an outer casing of a brake cable connected to brake lever 12.

A first pivot shaft 52 extends downwardly from lower surface 40a of bracket 40, and a second pivot shaft 53 extends upwardly from upper surface 40b of bracket 40. First pivot shaft 52 and second pivot shaft 53 extend coaxially with rotational axis X.

First pivot shaft 52 is formed of a synthetic resin. First pivot shaft 52 includes two engagement protrusions 52a that extend from the tip thereof and engage the two fixing holes 40e formed in bracket 40 to nonrotatably fix first pivot shaft to bracket 40, two radially protruding rotation preventing protrusions 52b aligned with engagement protrusions 52a and extending along the side of first pivot shaft 52, a rotation preventing protrusion 52c extending along the side of first pivot shaft 52 opposite rotation preventing protrusions 52b, a large-diameter flange 52d disposed below rotation preventing protrusions 52b and 52c, and a lever support portion 52e extending downwardly from flange 52d for rotatably supporting winding lever 48. Rotation preventing protrusions 52b are wider than rotation preventing protrusion 52c. The different widths of rotation preventing protrusions 52b and 52c allow first pivot shaft 52 to be mounted at a predetermined angular position relative to bracket 40, thereby eliminating assembly errors.

Second pivot shaft 53 also is formed of a synthetic resin. The tip of second pivot shaft 53 is dimensioned to fit through opening 44a in second cover member 44 for rotatably supporting release lever 50. Two radially protruding rotation preventing protrusions 53a extend along the side of second pivot shaft 53, and another radially protruding rotation preventing protrusion 53b extends along the side of second pivot shaft 53 opposite rotation preventing protrusions 53a. Rotation preventing protrusions 53a are wider than rotation preventing protrusion 53b. Rotation preventing protrusions 53a and 53b engage a fixing portion (not shown) provided on a lower surface of second cover member 44, thereby nonrotatably fixing second pivot shaft 53 relative to bracket 40. As with first pivot shaft 52, the different widths of rotation preventing protrusions 53a and 53b allow second pivot shaft 52 to be mounted at a predetermined angular position relative to bracket 40.

In this embodiment, winding body 32 comprises a cylindrical member formed of a synthetic resin. Winding body 32 is rotatably supported by first pivot shaft 52 for rotating in a cable pulling direction A and in a cable releasing direction B. Winding body 32 is biased in cable releasing direction B by a conical torsion coil spring 54. One end of spring 54 is fixed to winding body 32, and the other end of spring 54 is fixed to flange 52d of first pivot shaft 52.

Figure 6:
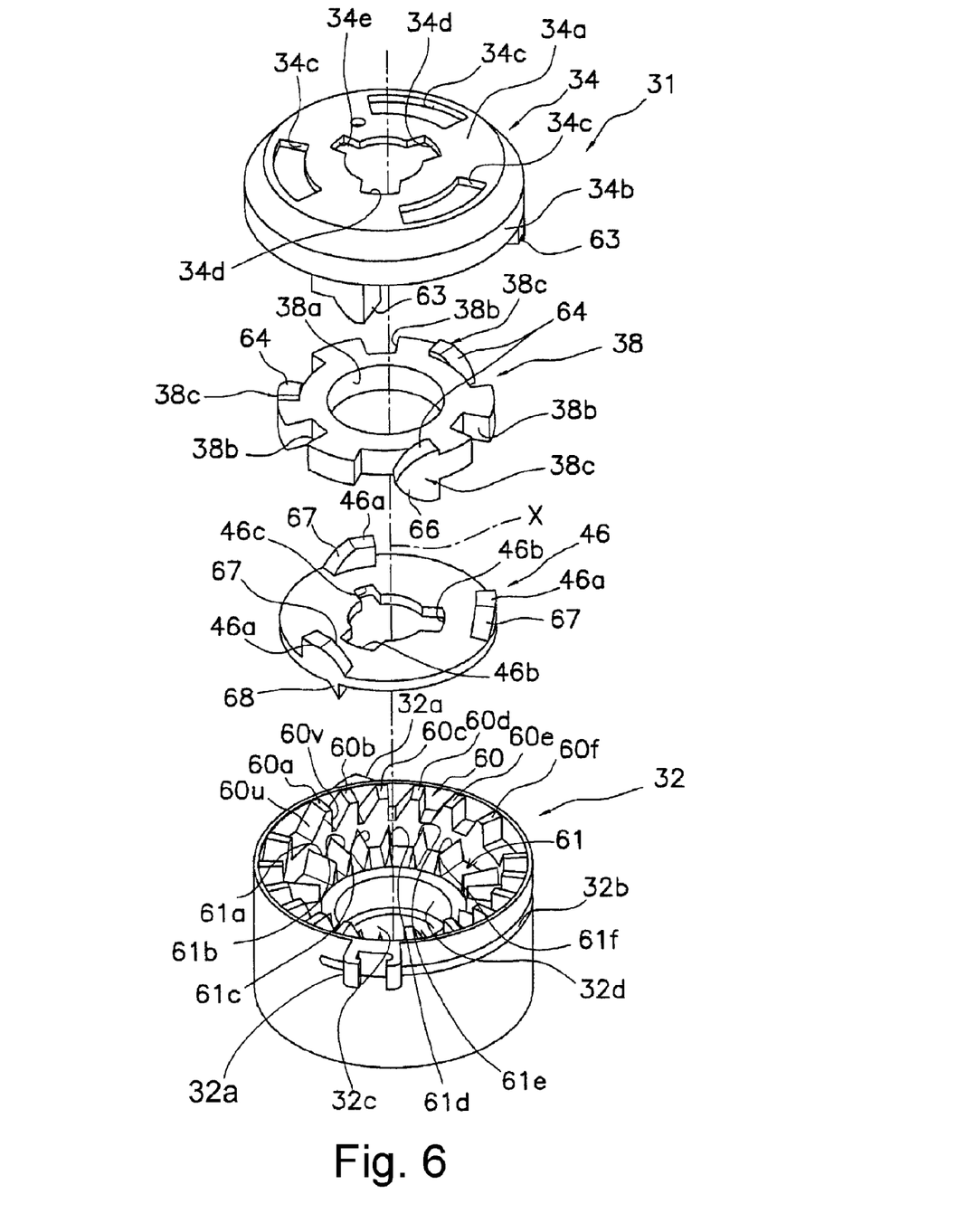
FIG. 6 is a an exploded perspective view of relevant portions of a positioning mechanism for the shift control device.
Figure 7:
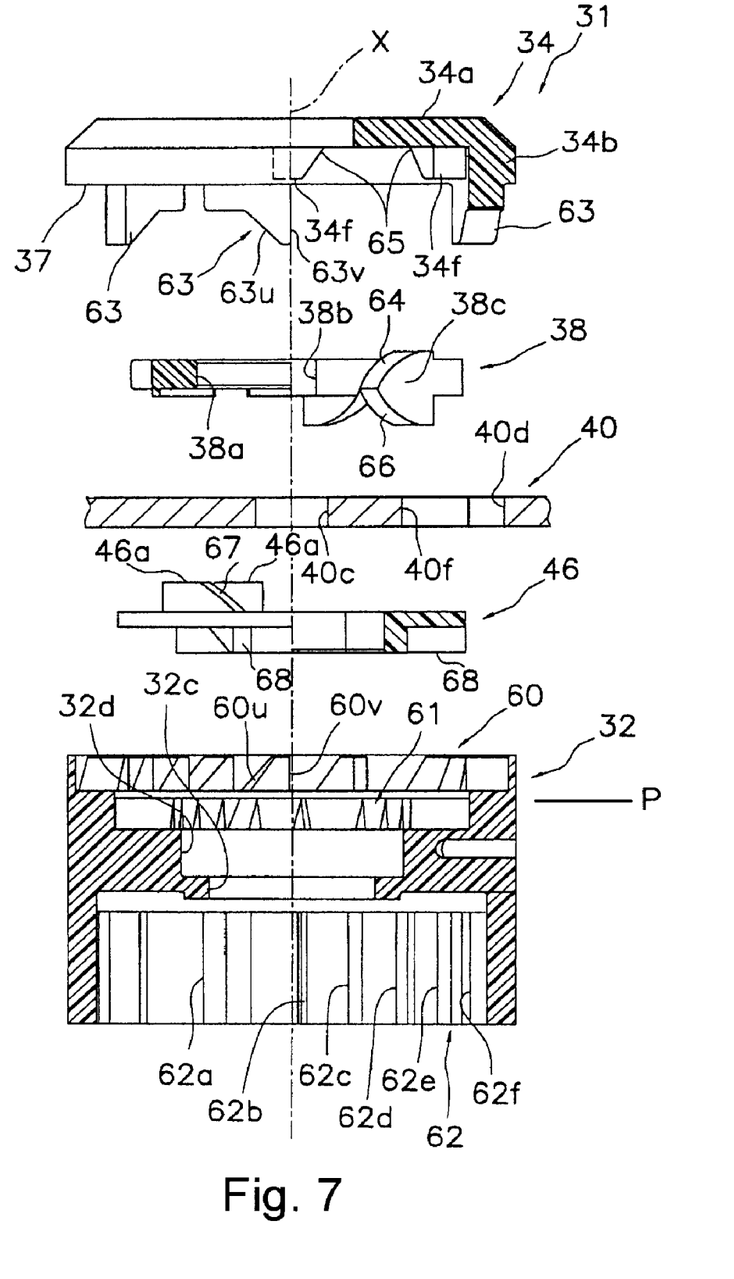
FIG. 7 is a an exploded partial cross-sectional view of relevant portions of the positioning mechanism for the shift control device.

As shown in FIGS. 6 and 7, winding body 32 includes, on an outer peripheral surface thereof, a cable fixing portion 32a and a cable winding groove 32b. Cable fixing portion 32a attaches a cable nipple (not shown) secured to a tip of an inner cable 26a (FIG. 1) of rear shift cable 26, and cable winding groove 32b supports inner cable 26a during winding and unwinding operations. Winding body 32 further includes a smaller-diameter shaft support hole 32c and a larger diameter spring support hole 32d disposed above shaft support hole 32c, wherein shaft support hole 32c is dimensioned for receiving first pivot shaft 52 therethrough.

Figure 8:
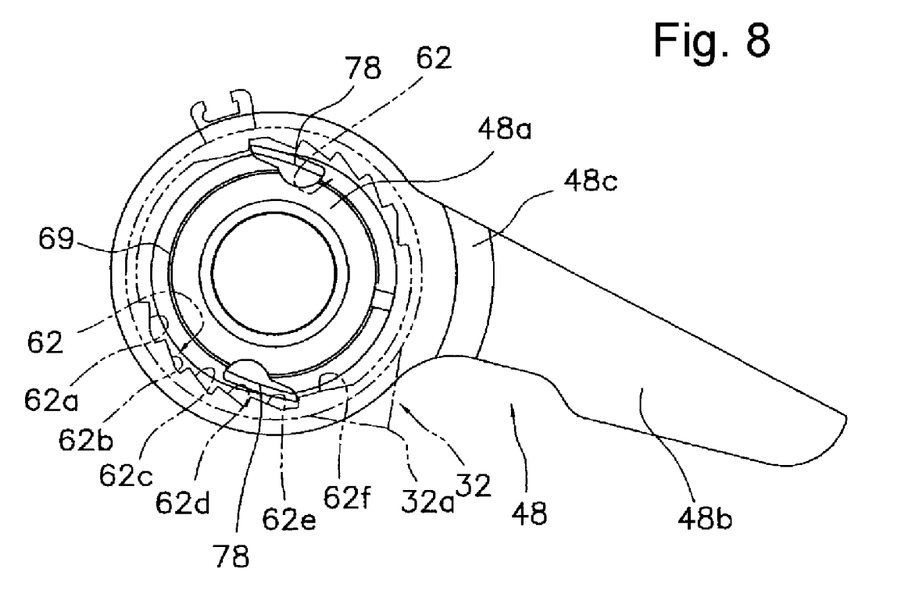
FIG. 8 is a plan view showing a relationship between a winding lever and a movable member.

A positioning tooth unit 60 and a stopping tooth unit 61 are disposed at the upper portion of winding body 32, and a drive tooth unit 62 is disposed at the lower portion of winding body 32. Positioning tooth unit 60 is formed as three circumferentially arranged groups with six positioning elements in the form of, e.g., positioning teeth 60a-60f in each group. Each positioning tooth 60a-60f extends radially inwardly and axially upwardly and includes an inclined cam surface 60u and a vertical surface 60v. In this embodiment, the tip of each positioning tooth 60a-60f is flush with the top surface of winding body 32. Stopping tooth unit 61 is disposed below and radially inwardly from positioning tooth unit 60. Stopping tooth unit 61 is formed as three circumferentially arranged groups with six stopping teeth 61a-61f in each group. Each stopping tooth 61a-61f extends radially inwardly and axially upwardly. Stopping teeth 61a-61f are positioned circumferentially out of phase with positioning teeth 60a-60f for reasons discussed below. As shown in FIGS. 7 and 8, drive tooth unit 62 comprises two groups with six drive teeth 62a-62f in each group. The tip of each drive tooth 62a-62f faces downwardly and is flush with the bottom surface of winding body 32.

The spacing between adjacent ones of positioning teeth 60a-60f, stopping teeth 61a-61f, and drive teeth 62a to 62f corresponds to the amount of movement of inner cable 26a needed to shift rear derailleur 19 to a corresponding rear sprocket 19b. The number of teeth in positioning tooth unit 60, stopping tooth unit 61, and drive tooth unit 62 is determined by the number of rear sprockets.

As shown in FIGS. 3 and 8, winding lever 48 includes a circular rotating portion 48a, a lever portion 48b extending radially outwardly from rotating portion 48a, and a pair of fixing pawls 78. Rotating portion 48a is pivotally connected to lever support portion 52e of first pivot shaft 52, and fixing pawls 78 are pivotally mounted on the outer peripheral surface of rotating portion 48a. The tips of fixing pawls 78 are biased radially outwardly by a C-shaped spring 69. Winding lever 48 pivots counterclockwise in a direction D shown in FIG. 2 from an initial or home position shown in FIG. 2 to an operating position. The rider typically pivots winding lever 48 from the home position to the operating position by pressing lever portion 48b with his or her thumb, for example. The pivot range is set by a fixing protrusion 48c formed on lever portion 48b and by a regulating slot (not shown) provided on a lower surface of first cover member 42. Winding lever 48 is biased towards the home position by a coil spring 58 disposed between winding lever 48 and a cap member 70 that is non-rotatably secured to the lower tip of first pivot shaft 52. As a result, winding lever 48 automatically returns to the home position after the rider removes his or her thumb from lever portion 48*b*.

A positioning mechanism 31 is mounted to first pivot shaft 52 and to second pivot shaft 53. Positioning mechanism 31 comprises positioning tooth unit 60 disposed on winding body 32, a positioning member 34 that positions winding body 32 in selected ones of a plurality of rotational positions, a biasing member in the form of a coil spring 36 that biases positioning member 34 in a direction towards winding body 32 (downwards in FIG. 3), a releasing member 38 disposed between winding body 32 and positioning member 34, and a stopping member 46 that prevents movement of winding body 32 during a cable releasing operation.

Positioning member 34 is formed of a synthetic resin. As shown in FIGS. 6 and 7, positioning member 34 includes a circular disc portion 34*a* and a tubular portion 34*b* integrally formed on the outer peripheral edge of circular disc portion 34*a*. Circular disc portion 34*a* includes two circumferentially disposed fixing openings 34*d* and one fixing opening 34*e* disposed opposite fixing openings 34*d*. Fixing openings 34*d* are wider than fixing opening 34*e*, and fixing openings 34*d* and 34*e* are dimensioned for receiving rotation preventing projections 53*a* and 53*b*, respectively, of second pivot shaft 53 therethrough so that positioning member 34 is non-rotatable but axially movable relative to second pivot shaft 53 toward and away from a plane of movement P of winding body 32. The different widths of fixing openings 34*d* and 34*e* on positioning member 34 and rotation preventing protrusions 53*a* and 53*b* on second pivot shaft 53 allow positioning member 34 to be mounted at a predetermined angular position relative to second pivot shaft 53. Three circumferentially disposed arcuate slits 34*c* are formed on disc portion 34*a* so as to align with slits 44*b* in second cover member 44.

A plurality of (e.g., three) circumferentially disposed positioning elements in the form of positioning teeth 63 extend axially from tubular portion 34*b* for engaging corresponding ones of positioning teeth 60*a*-60*f* in winding member 32. Positioning teeth 63 are dimensioned and positioned to extend through slits 40*d* in bracket 40. Each positioning tooth 63 includes an inclined cam surface 63*u* and a vertical surface 63*v*, wherein each cam surface 63*u* is configured to engage the cam surface 60*u* of a corresponding positioning tooth 60*a*-60*f* in winding body 32, and each vertical surface 63*v* is configured to engage the vertical surface 60*v* of a corresponding positioning tooth 60*a*-60*f* in winding body 32. The plurality of positioning teeth 63 evenly distribute the forces required to hold winding body 32 in a selected position. This is particularly advantageous when positioning member 34 is formed of a synthetic resin, which has lower rigidity than metal.

A plurality of (e.g., three) circumferentially disposed protrusions 34*f* extend axially from disc portion 34*a* and are disposed radially inwardly from positioning teeth 63. Protrusions 64 are recessed relative to a tip of 37 of tubular portion 34*b*, but they are dimensioned and positioned to extend through slits 40*f* in bracket 40. Each protrusion 34*f* has an inclined cam surface 65.

As shown in FIG. 3, spring 36 comprises a torsion coil spring. The upper end 36*a* of spring 36 extends through spring receiving opening 44*c* of second cover member 44 and is attached to release lever 50, and the lower end 36*b* of spring 36 is attached to disc portion 34*a* of positioning member 34. Spring 36 is mounted in a compressed state between second cover member 44 and positioning member 34. As a result, spring 36 axially biases positioning member 34 in a direction towards winding member 32 and rotationally biases release lever 50 towards an initial or home position shown in FIG. 2. Of course, while positioning member 34 and release lever 50 are biased by a single spring 36 in this embodiment, separate spring members may be used as appropriate.

Releasing member 38 comprises a circular disc-shaped member formed of a synthetic resin. Releasing member 38 includes a centrally disposed shaft support opening 38*a* and a plurality of (e.g., three) circumferentially disposed coupling recesses 38*b*. Support opening 38*a* is dimensioned to receive second pivot shaft 53 therethrough so that releasing member 38 is rotatably supported by second pivot shaft 53. Releasing member 38 further comprises a plurality of (e.g., three) circumferentially disposed and axially extending cam protrusions 38*c*. Each cam protrusion 38*c* includes an inclined cam surface 64 and an inclined cam surface 66, wherein cam surface 64 is configured to engage cam surface 65 of positioning member 34.

Release lever 50 comprises a circular rotating portion 50*a* rotatably mounted to the tip of second pivot shaft 53, a lever portion 50*b* extending radially outwardly from rotating portion 50*a*, and a plurality of (e.g., three) circumferentially disposed and axially extending rod-shaped connecting portions 50*c*. Connecting portions 50*c* are dimensioned and positioned to extend through slits 44*b* in second cover member 44, through slits 34*c* in positioning member 34, and into coupling recesses 38*b* in releasing member 38. As a result, release lever 50 and releasing member 38 rotate as a unit. The pivot range of release lever 50 is determined by opening 44*b* in second cover member 44.

As noted above, release lever 50 is biased counterclockwise to the home position shown in FIG. 2. The rider operates release lever 50 by pulling release lever 50 (typically with the right index finger) clockwise in the direction C shown in FIG. 2 to an operating position. At the same time, releasing member 38 rotates in a plane parallel to lower surface 40*a* of bracket 40. Release lever 50 returns to the home position when the rider releases his or her finger from lever portion 50*b*.

Stopping member 46 comprises a circular disc-shaped member formed of a synthetic resin. Stopping member 46 has an outside diameter that allows stopping member 46 to be inserted into winding body 32 radially inwardly of positioning teeth unit 60 so that stopping member 46 also contacts lower surface 40*a* of bracket 40. Stopping member 46 comprises a plurality of (e.g., three) circumferentially disposed and upwardly extending cam protrusions 46*a*, a plurality of (e.g., three) circumferentially disposed and downwardly extending stopping teeth 68, two circumferentially disposed fixing openings 46*b* and one fixing opening 46*c* disposed opposite fixing openings 46*b*. Each cam protrusion 46*a* has an inclined cam surface 67 that engages cam surface 66 of releasing member 38, and each stopping tooth 68 is configured to engage a corresponding one of the plurality of stopping teeth 61*a*-61*f* in winding member 61. Fixing openings 46*b* are wider than fixing opening 46*c*, and fixing openings 46*b* and 46*c* are dimensioned for receiving rotation preventing projections 52*b* and 52*c*, respectively, of first pivot shaft 52 therethrough so that stopping member 46 is non-rotatable but axially movable relative to first pivot shaft 52. Stopping member 46 is biased towards releasing member 38 by a coil spring 56 disposed in spring support hole 32*d* of winding body 32.

As shown in FIG. 3, the various components described above are mounted together by a securing bolt 72 that extends along rotational axis X and has a sufficient length to extend through second pivot shaft 53 (and the components mounted therethrough), through bracket 40, through first pivot shaft 52 (and the components mounted therethrough), and through cap member 70. A securing nut 74 is screwed onto a threaded tip of securing bolt 72. Since releasing member 38 is disposed between winding body 32 and positioning member 34, the radial size of rear shift control device 16 along rotational axis X may be reduced, thus resulting in a more compact design.

During a cable winding operation, the rider presses winding lever 48 in the direction D shown in FIG. 2 from the home position to the operating position. When winding lever 48 is operated from the home position to the operating position, fixing pawls 78 engage corresponding ones of drive teeth 62a-62f of drive tooth unit 62 of winding body 32, and winding body 32 rotates in the cable winding direction.

Figure 9:
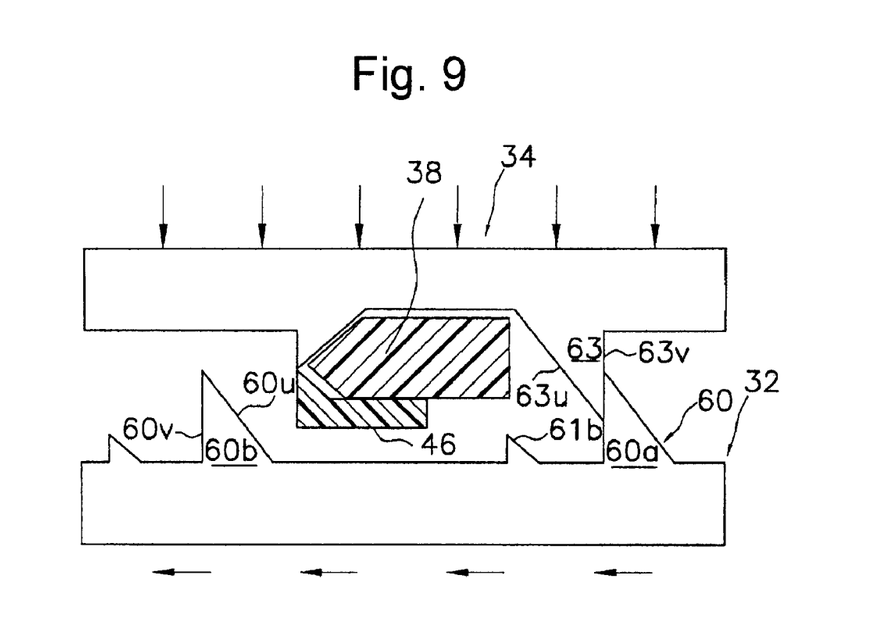
FIGS. 9-12 are schematic diagrams showing a cable winding operation.
Figure 10:
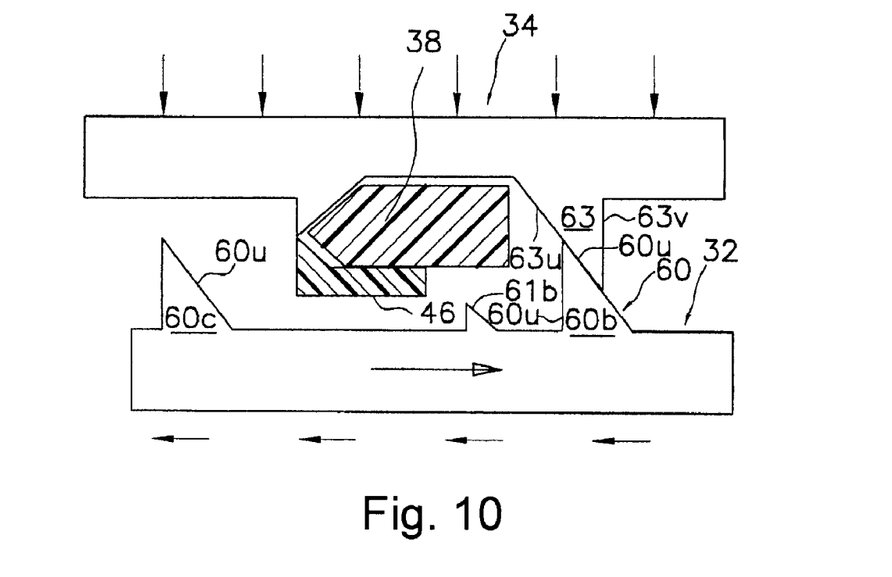
Figure 11:
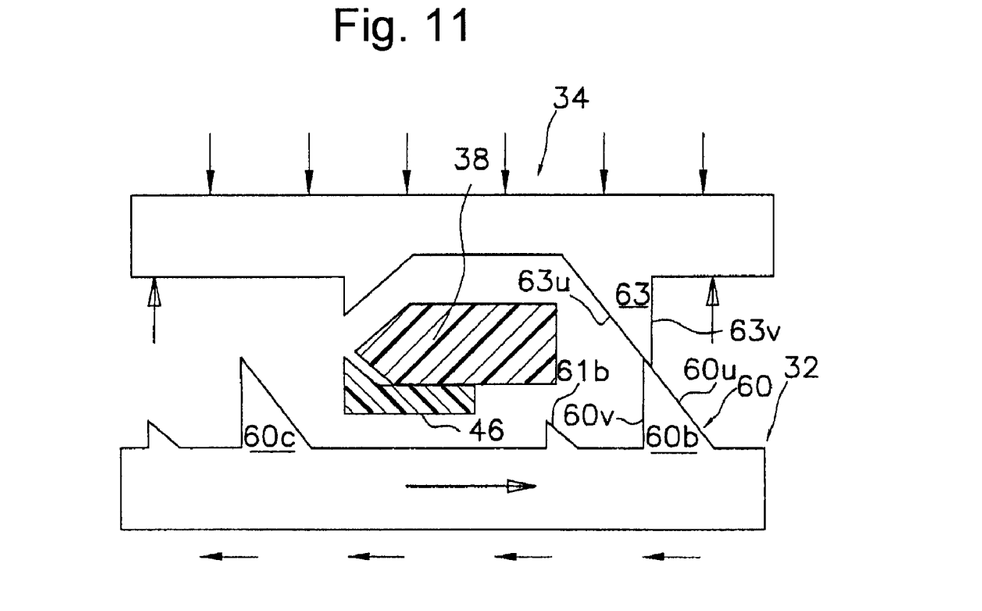
Figure 12:
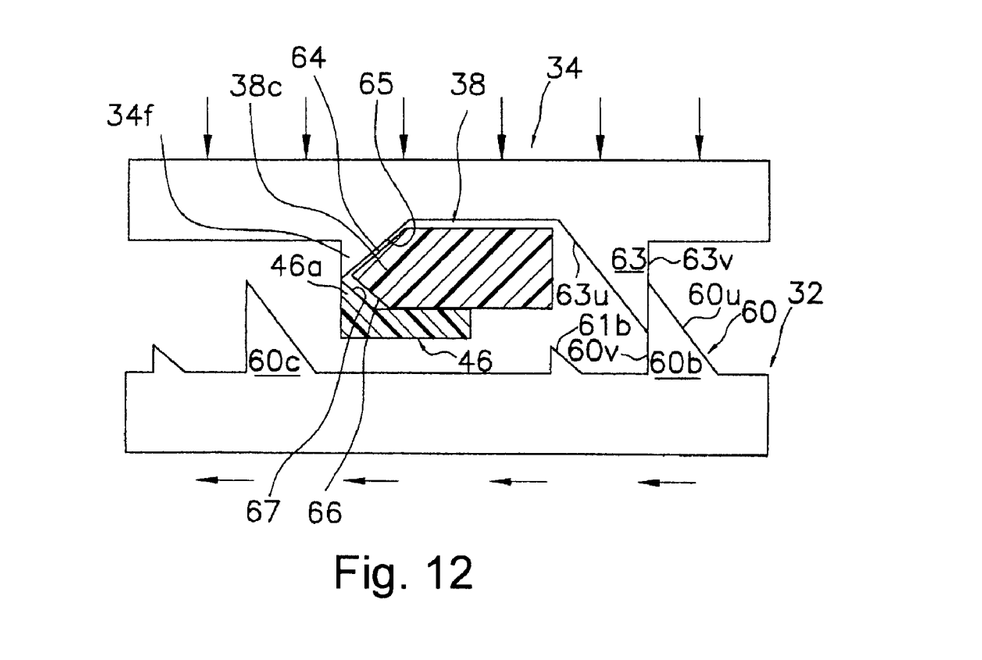

As shown in FIG. 9, assume that the winding operation is performed when positioning tooth 60a of positioning tooth unit 60 of winding body 32 is positioned at positioning tooth 63 of positioning member 34. When winding body 32 rotates in the cable winding direction shown by the outlined arrow in FIG. 10, the inclined cam surface 60u of positioning tooth 60b of winding body 32 presses against the inclined cam surface 63u of positioning tooth 63 of positioning member 34, cam surface 63u climbs up cam surface 60u as shown FIG. 11, and positioning member 34 moves in a direction away from winding body 32 against the biasing force of spring 36 as shown by the upwardly-pointing arrows. After positioning tooth 63 of positioning member 34 rides over positioning tooth 60b of winding body 32, positioning member 34 moves back towards winding body 32 as shown in FIG. 12, and the vertical surface 63v of positioning tooth 63 of positioning member 34 contacts the vertical surface 60v of positioning tooth 60 of winding member 32 to hold winding member 32 in the new position. As a result, rear derailleur 18 is downshifted by one speed stage, for example.

When the rider removes his or her thumb from winding lever 48, winding lever 48 returns to the home position as a result of the biasing force of spring 58. During this time, the tips of fixing pawls 78 are pressed radially inwardly by the various drive teeth 62a-62f of winding member 32 so that fixing pawls 78 simply ride over the tips of drive teeth 62a-62f. It should be readily apparent that fixing pawls 78 and drive teeth 62a-62f function as a one-way clutch mechanism wherein rotational movement of winding lever 48 is transferred to winding body 32 when winding lever 48 is operated from the home position to the operating position, but the rotational movement is not transferred from winding lever 48 to winding body 32 when winding lever 48 returns from the operating position to the home position.

Figure 13:
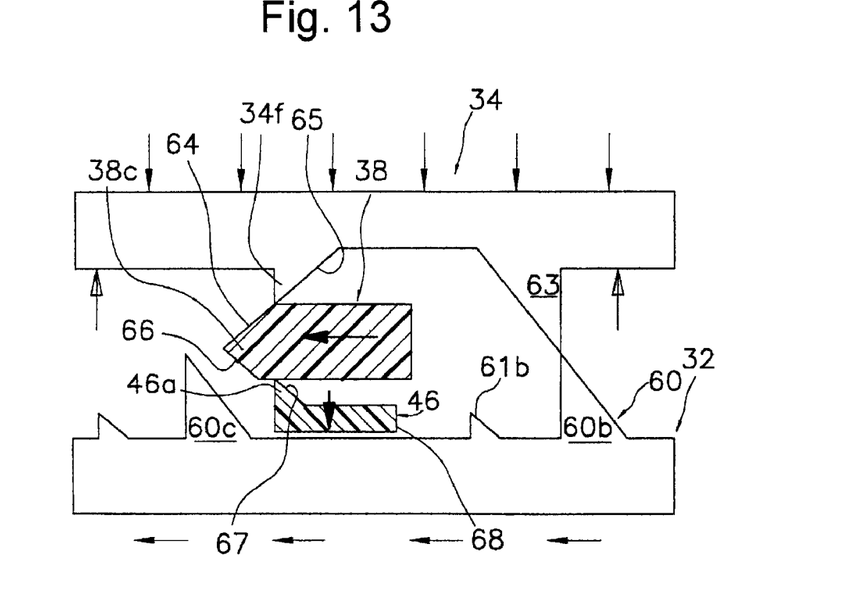
FIGS. 13-15 are schematic diagrams showing a cable releasing operation.
Figure 14:
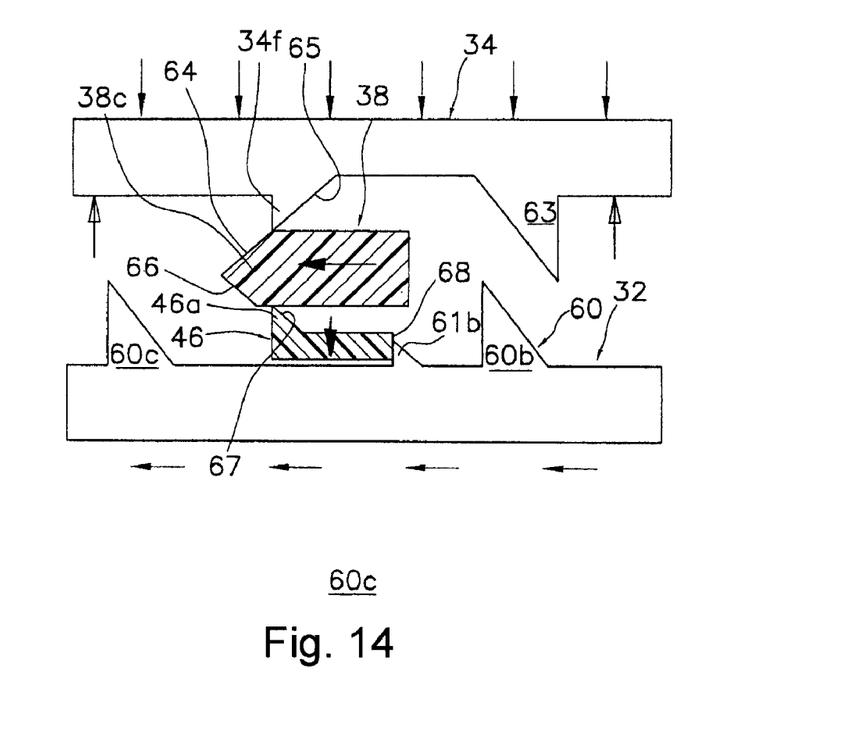

During a cable releasing operation, the rider pulls release lever 50 in the direction C shown in FIG. 2 from the home position to the operating position. As shown in FIG. 13, since release lever 50 rotates releasing member 38, cam surface 64 of releasing member 38 presses against cam surface 65 of tooth 34f of positioning member 34 and pushes positioning member 34 upwardly away from winding body 32 against the biasing force of spring 36. As a result, as shown in FIGS. 13 and 14, releasing member 38 moves positioning member 34 from an engaged position, wherein positioning teeth 63 of positioning member 34 engage positioning teeth 60b of winding body 32, to a disengaged position, wherein positioning teeth 63 of positioning member 34 are disengaged from positioning teeth 60b of winding body 32. When positioning member 34 is in the disengaged position, winding body 32 is allowed to rotate in the cable releasing direction as shown in FIG. 14 as a result of the biasing force of spring 54.

At the same time, cam surface 66 or releasing member 38 presses against cam surface 67 of stopping member 46 and pushes stopping member 46 towards winding body 32 against the biasing force of spring 56 as shown in FIGS. 12 and 13. As a result, stopping teeth 68 of stopping member 68 engage stopping teeth 61b of stopping tooth unit 61 of winding body 32 to prevent further rotation of winding body 32 in the cable releasing direction.

Figure 15:
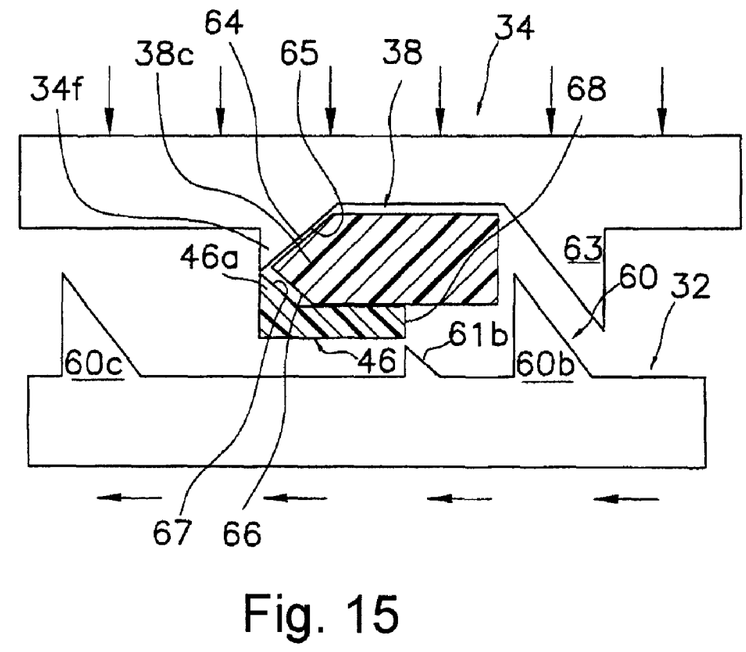

When the rider removes his or her finger from release lever 50, release lever 50 returns to the home position as a result of the biasing force of spring 36, and releasing member 38 rotates together with release lever 50. During this time, stopping member 46 moves upwardly away from winding body 32 and towards releasing member 38 as shown in FIG. 15 as a result of the biasing force of spring 36. When stopping teeth 68 of stopping member 46 disengage from stopping teeth 61b of winding body 32, winding body 32 resumes its rotation in the cable releasing direction until the vertical surfaces 63v of positioning teeth 63 of positioning member 34 contact the vertical surfaces 60v of corresponding positioning teeth 60a of winding member 32 to hold winding member 32 in the new position. As a result, rear derailleur 18 is upshifted by one speed stage, for example.

While the above is a description of various embodiments of inventive features, further modifications may be employed without departing from the spirit and scope of the present invention. For example, while positioning teeth were used for the positioning function, the positioning function may be performed by many other structures. For example, the positioning function may be accomplished using balls and recesses. While the disclosed positioning mechanism was used for shifting a rear derailleur, the teachings herein may be applied to a positioning mechanism for shifting a front derailleur or an internal hub transmission. While the positioning mechanism was placed inside the shift control device, such a positioning mechanism may be placed at a rear derailleur, at a front derailleur, or at an internal hub transmission.

The size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. For example, such terms may include a deviation of at least ±5% of the modified term as long as such a deviation would not negate the meaning of the word it modifies. Thus, the scope of the invention should not be limited by the specific structures disclosed or the apparent initial focus or emphasis on a particular structure or feature.

What is claimed is:

1. A positioning apparatus for a shift control device for a bicycle transmission comprising:
   a mounting bracket;

a movable member having a positioning element, wherein the movable member is coupled for movement relative to the mounting bracket;

a positioning member having a positioning element structured to engage the positioning element of the movable member;

wherein the positioning member moves between an engaged position, wherein the positioning element of the positioning member engages the positioning element of the movable member, and a disengaged position, wherein the positioning element of the positioning member is disengaged from the positioning element of the movable member;

wherein the positioning member moves toward and away from a plane of movement of the movable member;

a biasing member that biases the positioning member towards the engaged position;

a releasing member disposed between the movable member and the positioning member, wherein the releasing member moves relative to the mounting bracket between an initial position and an operating position;

wherein the releasing member allows the positioning member to be in the engaged position when the releasing member is in the initial position; and wherein the positioning member moves to the disengaged position when the releasing member moves to the operating position.

2. The apparatus according to claim 1 wherein movement of the releasing member is parallel to movement of the movable member.

3. The apparatus according to claim 1 wherein movement of the positioning member is perpendicular to movement of the releasing member.

4. The apparatus according to claim 1 wherein the positioning member moves away from the releasing member when the positioning member moves to the disengaged position.

5. The apparatus according to claim 1 wherein a cam surface of the releasing member cooperates with a cam surface of the positioning member to move the positioning member to the disengaged position when the releasing member moves to the operating position.

6. The apparatus according to claim 5 wherein the positioning member moves away from the releasing member when the positioning member moves to the disengaged position.

7. The apparatus according to claim 1 further comprising a stopping member that stops movement of the movable member when the releasing member moves to the operating position.

8. The apparatus according to claim 7 wherein the stopping member is disposed between the positioning member and the movable member.

9. The apparatus according to claim 7 wherein the releasing member is disposed between the positioning member and the stopping member.

10. The apparatus according to claim 7 wherein a cam surface of the releasing member cooperates with a cam surface of the stopping member to move the stopping member towards the movable member when releasing member moves to the operating position.

11. The apparatus according to claim 7 wherein the stopping member allows the movable member to move when the releasing member moves from the operating position back to the initial position.

12. The apparatus according to claim 1 wherein the positioning member includes a plurality of positioning abutments that engage a corresponding plurality of positioning abutments disposed on the movable member when the positioning member is in the engaged position.

13. The apparatus according to claim 1 wherein the movable member rotates around a rotational axis, and wherein the positioning member moves in a direction along the rotational axis between the engaged position and the disengaged position.

14. The apparatus according to claim 13 wherein the movable member rotates in a first direction when the releasing member causes the positioning member to move from the engaged position to the disengaged position, and wherein the movable member causes the positioning member to move to the disengaged position when the movable member rotates in an opposite second direction.

15. The apparatus according to claim 13 wherein the releasing member and the movable member rotate coaxially.

16. The apparatus according to claim 15 wherein a cam surface of the releasing member cooperates with a cam surface of the positioning member to move the positioning member to the disengaged position when the releasing member moves to the operating position.

17. The apparatus according to claim 15 further comprising a stopping member that stops movement of the movable member when the releasing member moves to the operating position.

18. The apparatus according to claim 17 wherein the stopping member moves in a direction along the rotational axis.

19. The apparatus according to claim 18 wherein the releasing member comprises:

a first cam surface that cooperates with a cam surface on the positioning member to move the positioning member between the engaged position and the disengaged position when the releasing member moves between the initial position to the operating position; and a second cam surface that cooperates with a cam surface on the stopping member to move the stopping member towards the movable member when the releasing member moves from the initial position to the operating position.

20. The apparatus according to claim 19 wherein the stopping member moves away from the movable member when the releasing member moves from the operating position back to the initial position, and wherein the positioning member moves towards the movable member when the releasing member moves from the operating position back to the initial position.

* * * * *